Oct. 6, 1931.  H. V. REED  1,825,981
DRIVEN PLATE FOR FRICTION CLUTCHES
Filed June 28, 1927
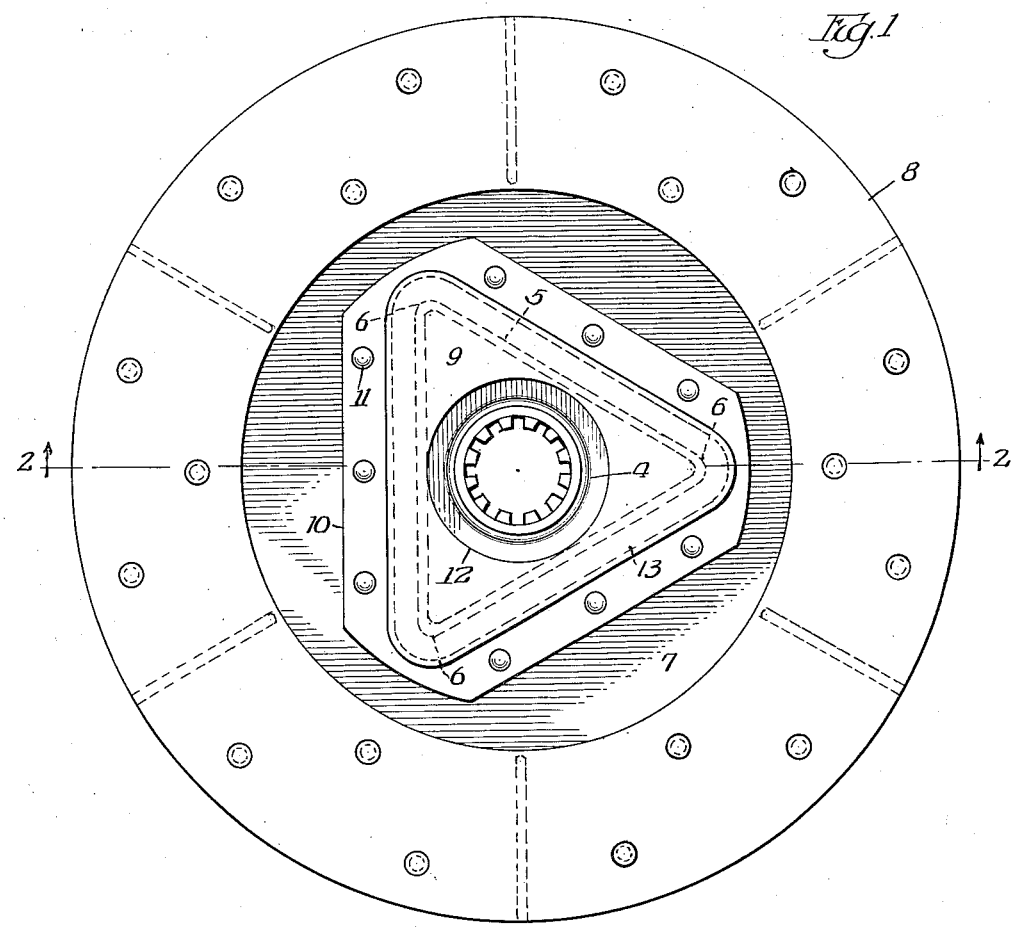
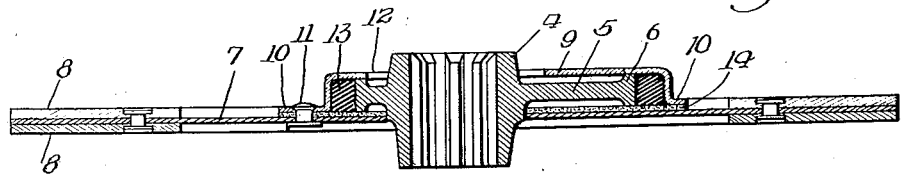
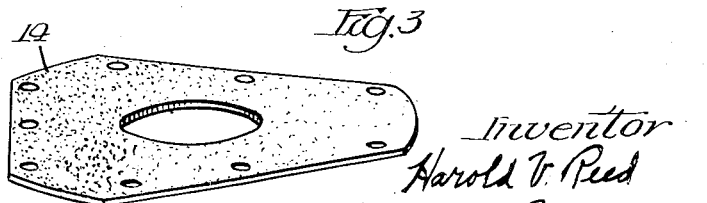
Inventor
Harold V. Reed
By Wm. O. Belt Atty.

Patented Oct. 6, 1931

1,825,981

UNITED STATES PATENT OFFICE

HAROLD V. REED, OF CHICAGO, ILLINOIS, ASSIGNOR TO THE BORG & BECK COMPANY, OF CHICAGO, ILLINOIS, A CORPORATION OF ILLINOIS

DRIVEN PLATE FOR FRICTION CLUTCHES

Application filed June 28, 1927. Serial No. 202,038.

This invention relates to friction clutches wherein a friction plate driven member is interposed between two parts of a driving member and is adapted to be gripped or clamped by the parts under sufficient pressure to impart motion from the driving member to the driven member.

The object of the invention is to protect the rubber cushion interposed between the hub member and the friction member of the driven plate from the friction heat which may be produced in the friction member by the operation of the clutch and cause deterioration of the cushion.

The invention has for its objects also, to prolong the life of the rubber cushion, to insulate the hub member from the friction member of the driven plate, and to preserve the resilient quality of the cushion.

In the accompanying drawings illustrating a selected embodiment of the invention, Fig. 1 is an elevation of a driven plate embodying the invention.

Fig. 2 is a transverse sectional view on the line 2—2 of Fig. 1.

Fig. 3 is a detail perspective view of the insulator.

Referring to the drawings, the driven plate comprises a friction member, which is mounted upon a centrally disposed hub member, and a compressible cushion interposed between said members and having an extended contact surface so that movement of the friction member is communicated through the cushion, and by compression only of the cushion, to the hub member. The hub member comprises a hub 4 having an integral flange 5 which, in the embodiment herein shown, is triangular in shape and has its three angles 6 symmetrically disposed about the hub 4. The friction member comprises a flat plate ring 7 which is mounted loosely on the hub adjacent one side of the flange. Friction facing rings 8 of suitable material are fastened to the plate at and adjacent its periphery and on opposite sides thereof. A casing 9 of triangular shape is provided with a peripheral flange 10 arranged to lie against the plate ring 7 and to which it is secured by rivets 11 or other suitable fastening devices. The casing has a centrally disposed opening 12 to receive the hub and between this opening and the flange 10 the casing is upset to receive the hub flange 5 and to form a cushion chamber about the periphery of the hub flange. A cushion strip 13 made of a single strip or of a plurality of strips of rubber or other suitable cushion material is arranged in this chamber. Movement of the friction member is communicated through the cushion to the hub member.

An insulator 14 is secured in place between the plate ring and the casing and hub member to protect the cushion from heat produced in operation of the clutch. The insulator may be an asbestos plate, or it may be made of any other suitable insulating material, and it is shaped generally to conform with the shape of the casing. The insulator is interposed between the hub flange and the casing flange and the plate ring, it lies flat against the plate ring and it is secured in place by the rivets 11 which secure the casing to the plate ring. This insulator protects the rubber cushion from the deteriorating effect of heat which may be produced in the friction member during the operation of the clutch.

I claim:

1. A driven plate for friction clutches comprising a hub member, a friction member yieldably mounted on the hub member and comprising a plate ring, an insulator plate interposed between the hub member and the plate ring, and means for securing the insulator plate to the plate ring whereby said insulator plate will be movable relative to the hub member.

2. A driven plate for friction clutches comprising a hub member, a friction member yieldably mounted on the hub member and comprising a plate ring, a casing on the plate ring forming a cushion chamber, one wall of said cushion chamber being formed by the hub member and one wall being formed by the plate ring, a cushion in said chamber, and an insulator plate interposed between the cushion and the plate ring.

3. A driven plate for friction clutches comprising a hub member, a friction member yieldably mounted on the hub member and comprising a plate ring, a casing on the plate ring forming a cushion chamber between itself, the plate ring and the hub member, a cushion in said chamber, and an insulator plate lying flat against the plate ring and interposed between the cushion and the plate ring.

4. A driven plate for friction clutches comprising a hub member having a peripheral flange, a friction member yieldably mounted on the hub member and comprising a plate ring extending alongside the flange, a casing on the plate ring forming a cushion chamber between itself, the plate ring and the flange, a cushion in said chamber, an insulator plate lying flat against the plate ring and interposed between the plate ring and the casing, the cushion and the flange, and means fastening the casing and the insulator to the plate ring.

5. A driven plate for friction clutches comprising a hub member, a friction member yieldably mounted on the hub member and comprising a plate ring, a casing on the plate ring defining a cushion chamber, an insulator plate interposed between the hub member and the plate ring, and common means for securing the insulator plate and the casing to the plate ring whereby said casing and said plate will be movable relative to the hub member.

HAROLD V. REED.